G. T. McMILLAN.
CUSHIONED WHEEL.
APPLICATION FILED APR. 29, 1918.
1,293,145.
Patented Feb. 4, 1919.
2 SHEETS—SHEET 1.
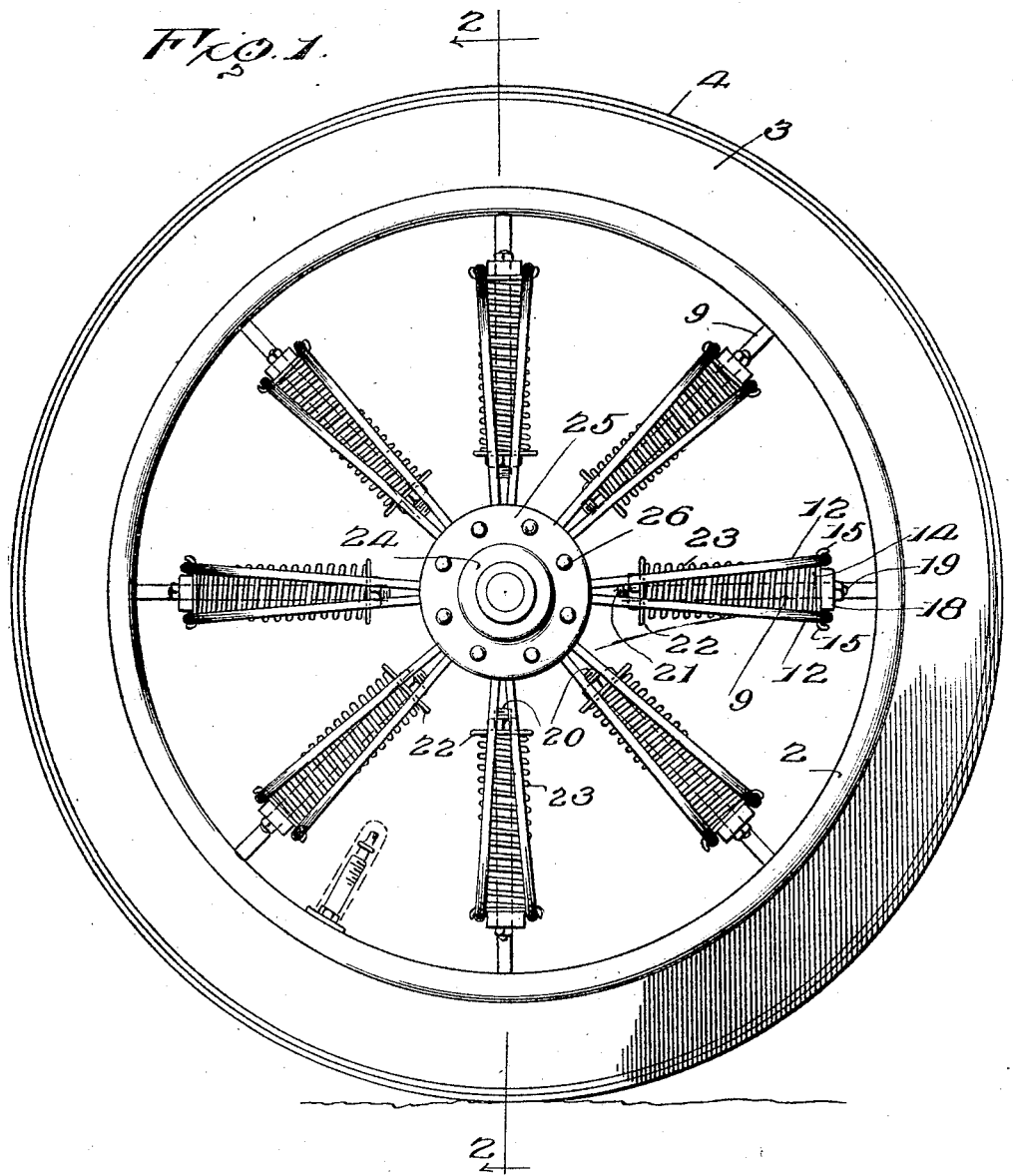
Inventor
George T. McMillan
By Lacey, Attorneys

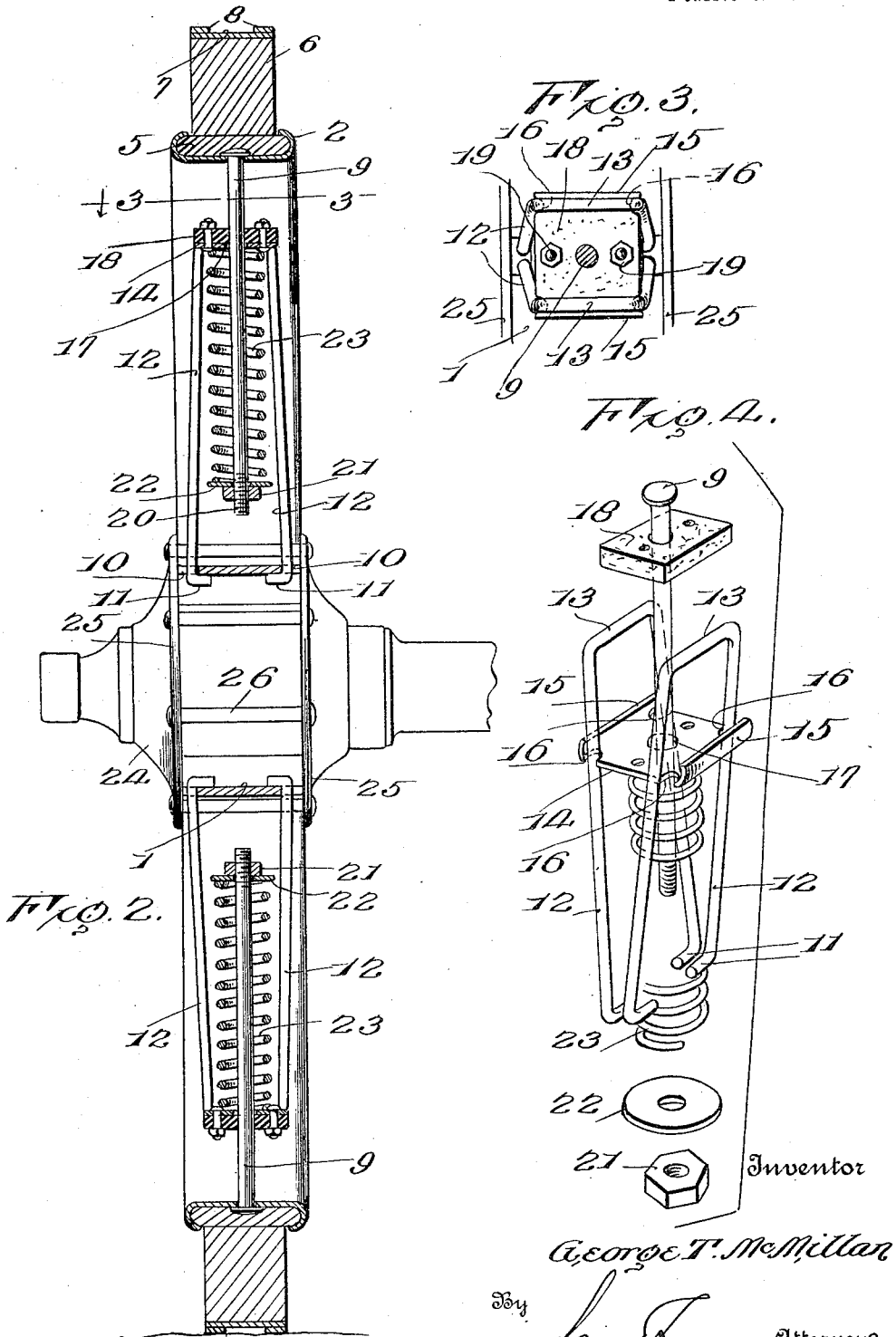

UNITED STATES PATENT OFFICE.

GEORGE T. McMILLAN, OF BROOKINGS, SOUTH DAKOTA.

CUSHIONED WHEEL.

1,293,145.  Specification of Letters Patent. Patented Feb. 4, 1919.

Application filed April 29, 1918. Serial No. 231,515.

*To all whom it may concern:*

Be it known that I, GEORGE T. MCMILLAN, a citizen of the United States, residing at Brookings, in the county of Brookings and State of South Dakota, have invented certain new and useful Improvements in Cushioned Wheels, of which the following is a specification.

This invention relates to cushioned wheels and has for its object the provision of a wheel for automobiles, trucks, or other vehicles which will possess a high degree of resiliency so that the travel of the vehicle over rough roads will be smooth and comfortable, while at the same time the wheel will possess all the strength necessary to durability and to permit the wheel to withstand the shocks due to rough travel and hard usage.

The invention is illustrated in the accompanying drawings, in which—

Figure 1 is a side elevation of a wheel embodying my present improvements;

Fig. 2 is a vertical section taken on the line 2—2 of Fig. 1, but showing a form of tire different from that shown in Fig. 1;

Fig. 3 is a detail section on the line 3—3 of Fig. 2;

Fig. 4 is a detail group perspective of the parts of a spoke structure showing the same separated but approximately in their proper relative positions.

My improved wheel comprises a hub shell 1 and a rim 2 which may be of any well-known clencher type, the hub shell and the rim being connected by resilient spoke structures which will be presently fully described. In Fig. 1 a pneumatic tire 3 is shown fitted to the rim 2 and this tire may be equipped with any form of guard or armor, indicated at 4. In Fig. 2, I show a cushion 5 of rubber or similar material fitted upon the rim 2 and this cushion is compressed upon the rim so as to tend to expand and thereby retain in position a wooden felly 6. Upon the felly may be secured a metallic tire 7 reinforced by tread members 8 at its edges.

At regular intervals, I secure in the rim 2 the inwardly projecting radial spoke bolts 9 and at corresponding intervals I construct notches or recesses 10 in the edges of the hub shell 1. In the said notches, I engage the inner hooked ends 11 of U-shaped bails or loops 12 which have their shoulders 13 engaged over washers or retaining plates 14 which are constructed with flanges 15 at their end edges against which the shoulders 13 of said bails will bear and in their side edges these retaining plates are constructed with notches 16 to engage the sides of the bails so that said bails will be effectually held against displacement. The retaining plates or washers 14 are provided each with a central opening 17 through which the bolt 9 passes. A fiber washer 18 is provided around the bolt 9 and is held upon the retaining plate or metallic washer 14 by screws or similar fastenings 19. This fiber washer will frictionally engage the bolt so that it will retard the movement thereof without excessive wear and will thus impart sufficient rigidity to the wheel to prevent sudden or excessive yielding of the same to obstructions so that deformation of the wheel and resultant rough riding will be avoided. The inner extremity of each spoke bolt is threaded, as shown at 20, and upon the said threaded extremity is fitted a nut 21 bearing against a washer 22 fitted upon the bolt and receiving the thrust of a spring 23 which is coiled around the bolt between the said washer 22 and the retaining plate 14.

The hub 24 may be of any preferred construction but should be equipped with annular flanges or equivalent members 25 through which bolts 26 may be inserted to clamp the hub against the opposite side edges of the hub shell 1.

The several parts of the structure being assembled in the positions shown and described, the nuts 21 are adjusted to impart the desired tension to the springs 23 and the wheel is then used in the usual manner. The springs 23 tend constantly to expand so that the rim and tread members of the wheel will be held concentrically with the hub and axle. Should the wheel encounter ridges or other obstructions in the road, the springs at the upper portion of the wheel will be compressed while a corresponding expansion will be permitted in the springs of the lower portion of the wheel so that the axle and the body of the vehicle will not be subjected to sudden shocks and violent vertical oscillation. It will be noted that the inner ends of the bails or loops are not secured to the hub shell but merely engage through notches in the edges thereof so as to bear against the inner surface of the shell. When, therefore, the rim tends to move upwardly relative to the hubs, the spokes which may happen to be parallel or approximately parallel to the ground will also tend to follow the upward movement of the rim at their outer ends and the upper loop or bail coacting with each of said spokes will slide inwardly at its inner end through the notches in the hub shell while the lower bail or loop coacting with each of said spokes will have a pivotal turning movement upon the shell so as to accommodate the relative displacement of the parts. The spokes are disposed preferably so that there are always two opposed spokes and the springs acting upon the spokes tend, as a result of their joint action, to maintain the rim concentric with the hub. As a result of this tendency of the springs the radial movement of the spokes will be greatest in those spokes which are in a vertical plane, while those spokes which are obliquely disposed will have less radial movement and those which are horizontal or approximately horizontal will have only so much radial movement as will be permitted by the travel of the wheel acting with the vertical displacement of the rim. The improved structure is very simple in the form and arrangement of its several parts and may be readily assembled by unskilled persons so that should any one part be broken, a new part may be substituted therefor without requiring the services of a skilled mechanic or necessitating the provision of an entirely new wheel.

Having thus described the invention, what is claimed as new is:

1. The combination of a hub member, a rim, a plurality of independent spokes secured in and extending radially inward from the rim and having free inner ends, retaining plates fitted upon the several spokes, independent loops having their inner ends slidably fitted in the hub member and their outer ends spanning the said retaining plates at opposite sides of the respective spokes, stops adjustably secured upon the inner ends of the several spokes, and springs coiled around the said spokes between the said stops and the retaining plates.

2. In a wheel, the combination of a hub shell, a rim, a spoke secured in and projecting inwardly from the rim and terminating short of the hub shell, loops having their inner ends extending into and slidably engaging the hub shell and projecting outwardly therefrom at the sides of the spoke, a retaining plate fitted upon the spoke and constructed to engage the sides and outer ends of the said loops to prevent displacement thereof, an adjustable stop upon the inner end of the spoke, and a spring coiled around the said spoke between said stop and the retaining plate.

3. In a wheel, the combination of a hub shell, a rim, a spoke secured in and extending inwardly from the rim, bails having their inner ends engaged in the hub shell, a retaining plate fitted upon the spoke and provided with flanges engaging against the bails and with notches engaging the sides of the bails, a stop upon the inner end of the spoke, and a spring coiled around the spoke between the stop and the retaining plate.

4. In a wheel, the combination of a hub shell, a rim, a spoke extending inwardly from the rim, bails having their inner ends engaged in the hub shell, a retaining plate upon the spoke engaging the outer portions of the bails, a fiber washer secured upon said retaining plate around the spoke, a stop upon the inner end of the spoke, and a spring coiled around the spoke between said stop and the retaining plate.

In testimony whereof I affix my signature.

GEORGE T. McMILLAN. [L. S.]

Copies of this patent may be obtained for five cents each, by addressing the "Commissioner of Patents, Washington, D. C."